(12) United States Patent
Bodano et al.

(10) Patent No.: US 9,479,059 B2
(45) Date of Patent: Oct. 25, 2016

(54) VOLTAGE CONVERTER FOR FIRST AND SECOND MODES OF OPERATION

(71) Applicant: Infineon Technologies AG, Neubiberg (DE)

(72) Inventors: Emanuele Bodano, Villach (AT); Luca Bizjak, Villach (AT); Maria Giovanna Lagioia, Villach (AT); Joachim Pichler, Landskron (AT); Massimiliano Fieni, Udine (IT)

(73) Assignee: Infineon Technologies AG, Neubiberg (DE)

( * ) Notice: Subject to any disclaimer, the term of this patent is extended or adjusted under 35 U.S.C. 154(b) by 227 days.

(21) Appl. No.: 14/320,209

(22) Filed: Jun. 30, 2014

(65) Prior Publication Data

US 2015/0381044 A1    Dec. 31, 2015

(51) Int. Cl.
*G05F 1/56* (2006.01)
*H02M 3/158* (2006.01)
*H02M 3/156* (2006.01)

(52) U.S. Cl.
CPC ... *H02M 3/1588* (2013.01); *H02M 2003/1566* (2013.01); *Y02B 70/1466* (2013.01)

(58) Field of Classification Search
CPC .......................................... H02M 2001/0006
USPC ........................................ 323/271–289, 351
See application file for complete search history.

(56) References Cited

U.S. PATENT DOCUMENTS

| | | | | |
|---|---|---|---|---|
| 6,049,471 A * | 4/2000 | Korcharz | ........... | H02M 3/33515 363/20 |
| 7,075,276 B2 * | 7/2006 | Morales | ............. | H02M 3/1588 323/246 |
| 7,626,837 B2 * | 12/2009 | De La Torre | ..... | H02M 3/33546 363/41 |
| 8,232,791 B2 * | 7/2012 | Yee | .......................... | H02M 1/36 323/285 |
| 8,350,543 B2 * | 1/2013 | Loikkanen | .......... | H02M 3/1582 323/259 |
| 8,901,908 B2 | 12/2014 | Tang et al. | | |
| 8,970,196 B2 | 3/2015 | Henzler | | |
| 2008/0203989 A1 | 8/2008 | Bacchi et al. | | |
| 2010/0096923 A1 * | 4/2010 | Marsili | .................... | H02M 3/00 307/31 |
| 2011/0115453 A1 * | 5/2011 | Marsili | ............... | H02M 3/1582 323/282 |
| 2011/0210707 A1 * | 9/2011 | Marsili | .................. | H02M 3/158 323/271 |
| 2014/0355314 A1 * | 12/2014 | Ryan | ................. | H02M 3/33507 363/21.01 |

FOREIGN PATENT DOCUMENTS

| | | |
|---|---|---|
| DE | 102011077174 A1 | 12/2011 |
| DE | 102012101009 A1 | 8/2012 |
| WO | 2011005824 A2 | 1/2011 |

OTHER PUBLICATIONS

Zhang, X. et al., "Digital PWM/PFM Controller with Input Voltage Feed-Forward for Synchronous Buck Converters," Twenty-Third Annual IEEE Applied Power Electronics Conference and Exposition (APEC), Feb. 24-28, 2008, pp. 523-528.

* cited by examiner

*Primary Examiner* — Adolf Berhane
*Assistant Examiner* — Nusrat Quddus
(74) *Attorney, Agent, or Firm* — Shumaker & Sieffert, P.A.

(57) ABSTRACT

Methods and devices are provided wherein a change of a mode of operation is performed based on a time where both switches of a first and a second switch are open.

19 Claims, 6 Drawing Sheets

VOLTAGE CONVERTER FOR FIRST AND SECOND MODES OF OPERATION

TECHNICAL FIELD

The present application relates to changing a mode of operation of a device comprising switches.

BACKGROUND

Converters are devices used for converting an input quantity to an output quantity. Examples for converters include current converters and voltage converters. Voltage converters may for example DC/DC-converters, which convert an input voltage to an output voltage. Examples for such voltage converters include buck converters, boost converters or buck-boost converters. Such voltage converters are for example used in switched mode power supplies (SMPS) which are used to generate a stable output voltage to supply further devices with power.

In order to optimize efficiencies, such converters, for example buck converters, have two modes of operation according to which e.g. switches like a high side switch and a low side switch may be operated. A first mode of operation is referred to as pulse frequency modulation mode (PFM), and a second mode is referred to as pulse width modulation (PWM) mode in some applications. For example, in some applications a PFM mode may be advantageous for example in terms of efficiency for comparatively lower loads, while the PWM mode may be more suitable for comparatively higher loads. Various approaches exist how to change between the modes, for example how to detect when due to a load change a change between the modes of operation should be performed. However, conventional approaches may suffer various drawbacks.

DETAILED DESCRIPTION

In the following, various embodiments will be described referring to the attached drawings. It should be noted that the embodiments described hereinafter and shown in the drawings are provided merely by way of example and are not to be construed as limiting. For example, while embodiments may be described comprising a plurality of features or elements, in other embodiments some of the features or elements described may be omitted and/or replaced by alternative features or elements. In yet other embodiments, additionally or alternatively additional features or elements may be provided.

Features from different embodiments may be combined to form further embodiments unless noted otherwise.

In the embodiment shown in the drawings or described hereinafter, connections or couplings between elements described may be direct connections or couplings, i.e. connections or couplings without intervening elements, or indirect connections or couplings, i.e. connections or couplings with one or more intervening elements, as long as the general purpose and/or function of the connection or coupling, for example to transmit a certain kind of information or a certain kind of signal, is essentially preserved. Connections or couplings may be wire-based connections or couplings or wireless connections or couplings unless noted otherwise.

Some embodiments comprise switches, for example a high side switch and a low side switch, as will be further explained below in more detail. For ease of reference, switches may be described as having a control terminal, a first load terminal and a second load terminal. When the switch is closed, current may flow between the first load terminal and the second load terminal. When the switch is open, the switch is essentially (apart from possibly occurring undesired effects like leakage currents etc.) non-conducting between the first and second load terminals. Opening and closing of the switch may be controlled via the control terminal. Such switches may for example be implemented using transistors like field effect transistors, bipolar transistors or mixtures thereof like insulated gate bipolar transistors (IGBTs). In this case, a base terminal or gate terminal of the transistor may serve as control terminal of the switch, and collector and emitter terminals or source and drain terminals may serve as load terminals of the switch.

In some embodiments, switches may be provided in a voltage converter like a buck converter, and a high side switch and a low side switch may be controlled to convert an input voltage to an output voltage. In embodiments, operation may be changed between two modes, for example a pulse frequency modulation (PFM) mode and a pulse width modulation (PWM) mode. For example, the PFM mode may be used at comparatively low loads corresponding to a comparatively low output power, and the PWM mode may be used at comparatively higher loads corresponding to a higher output power. For example, the PFM mode may achieve a better efficiency as there need not always be a switching as in the PWM mode, but in PFM mode a switching may be performed only just when a switching is needed to keep an output voltage higher than a desired threshold. However, at higher loads a drop of the output voltage may occur with such an approach, making it desirable to switch to PWM mode in some applications.

Various embodiments monitor a frequency and/or a timing of a switching, i.e. an operating of switches, in a PFM mode and decide on changing to a PWM mode based on the monitoring. For example, in some embodiments, a time where a high side switch and a low side switch are both open, for example a tristate mode, may be measured and compared to a threshold time. If the measured time is smaller than the threshold time, a mode change may be initiated.

It should be known that operating a converter in PFM mode or PWM mode may be done in any manner conventionally known in the art, such that the modes of operations per se will not be described in every detail herein. The present application instead focuses on certain techniques for determining when a change between modes of operation should be performed, for example from a PFM mode to a PWM mode.

Voltage converters as mentioned above may for example be used in switched mode power supplies (SMPSs), which will be used as an example environment in the following explanations. However, techniques described herein may be generally applicable to cases where converters, in particular voltage converters, are selectively operable in a first mode of operation or in a second mode of operation.

Figure 1:
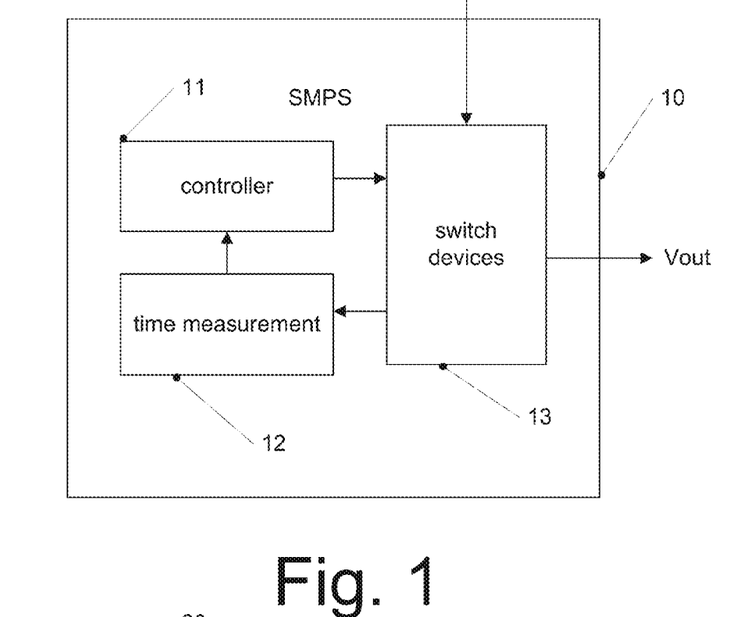
FIG. 1 is a block diagram illustrating a switched mode power supply device according to an embodiment.

Turning now to the figures, in FIG. 1 an SMPS device 10 according to an embodiment is illustrated. SMPS device 10 in the illustrated embodiment receives an input voltage Vin and outputs an output voltage Vout, which in some embodiments may be smaller than Vin. In other embodiments, other relationships between Vin and Vout may apply.

SMPS device 10 comprises switch devices 13, for example a high side switch and a low side switch to form a buck converter as will be explained further below, which are operated to convert input voltage Vin to output voltage Vout. Switch devices 13 are controlled by a controller 11. Controller 11 may selectively operate switch devices 13 in at least two different operating modes, for example a PFM mode and a PWM mode. Furthermore, SMPS device 10 comprises a time measurement block 12. Time measurement block 12 in embodiments measures a timing in a mode of operation of switch devices 13. Based on the measurement, controller 11 may decide to change between operation modes. For example, time measurement block 12 may comprise a counter to perform a digital time measurement. In some embodiments, time measurement block 12 may measure a time during which switch devices 13 are in a tristate mode. The controller 11 may then take the decision whether to change modes based on a comparison of the measured tristate time with a threshold time. In some embodiments, the time measurement may only be performed up to the threshold time, and if the tristate mode has not ended, for example no change of mode will be performed. In some embodiments, the time measurement may be indicative of a load current of switching device 10. In some embodiments, for example a decision whether to switch from a PFM mode to a PWM mode may be taken. In other embodiments, other techniques may be employed. Examples for time measurements will be discussed further below.

In some embodiments, controller 11 may receive the output voltage Vout to implement a regulation loop regulating Vout to a desired value. In such embodiments, it may be possible to regulate Vout to a desired value.

One or more of the blocks illustrated in FIG. 1 may be implemented in a common circuit and may be implemented using hardware, software, firmware or combinations thereof.

Figure 2:
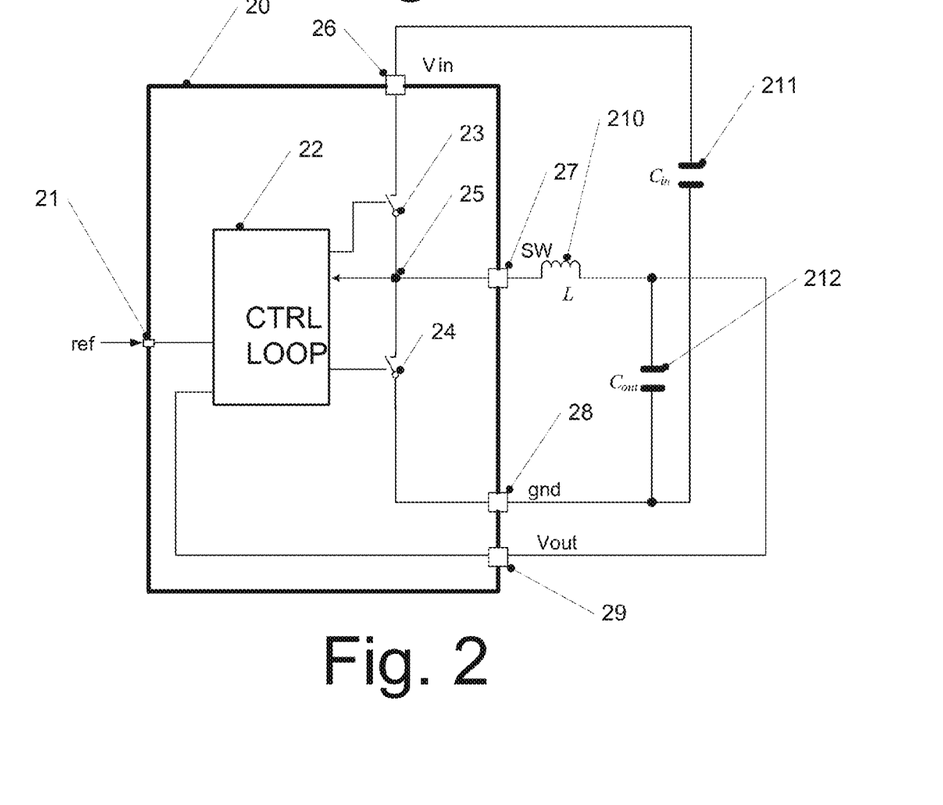
FIG. 2 is a diagram illustrating a buck converter.

In FIG. 2, a block diagram of a switched mode power supply (SMPS) device 20 with a buck converter is shown to illustrate a possible implementation of switch devices and voltage conversion applicable to some embodiments. SMPS device 20 of FIG. 2 comprises a first switch 23, also referred to as high side switch, and a second switch 24, also referred to as low side switch. SMPS device 20 includes a voltage input terminal 26 to receive an input voltage Vin, a ground terminal 28 to be coupled to ground (gnd), a feedback terminal 29 to receive an output voltage Vout and a reference terminal 21 to receive for example a reference signal or clock reference. Furthermore, SMPS device 20 comprises a switching output terminal 27. A first load terminal of high side switch 23 is coupled with terminal 26, a second load terminal of first switch 23 is coupled with a node 25, a first load terminal of switch 24 is also coupled with node 25 thus coupling the second load terminal of switch 23 with the first load terminal of second switch 24, and a second load terminal of second switch 24 is coupled with ground terminal 28. Node 25 is further coupled with switching output 27. Control inputs of first switch 23 and second switch 24 are controlled by a controller 22. Controller 22 receives an output signal via terminal 29, thus implementing a control loop in the implementation of FIG. 2.

An output capacitor 212 is coupled between switching terminal 27 and ground terminal 28 via an inductor 210. By closing switch 23, for example inductor 210 may be charged, and by closing switch 24 inductor 210 may be decharged. A current from inductor 210 is fed to output capacitor 212. In other types of converters, for example boost converters, an output capacitor may be directly charged and decharged by closing the respective switches. In addition to the elements shown, one or more loads may be provided receiving a load current of the SMPS device 20 illustrated in FIG. 2.

Moreover, an input capacitor 211 is coupled between voltage input terminal 26 and ground terminal 28. Input capacitor 211 may for example represent an input voltage source. The input voltage Vin in some embodiments may be variable. For example, in some automotive applications a battery supply provided within a vehicle may have a wide operation range, for example between 8 V and 20 V. SMPS device 20 in response thereto may provide an output voltage Vout which is inside a desired range. Controller 22 may operate switches 23, 24 in at least two different operation modes, for example a PFM mode or a PWM mode.

Various components of SMPS device 20 may for example be integrated in a common chip.

Figure 3:
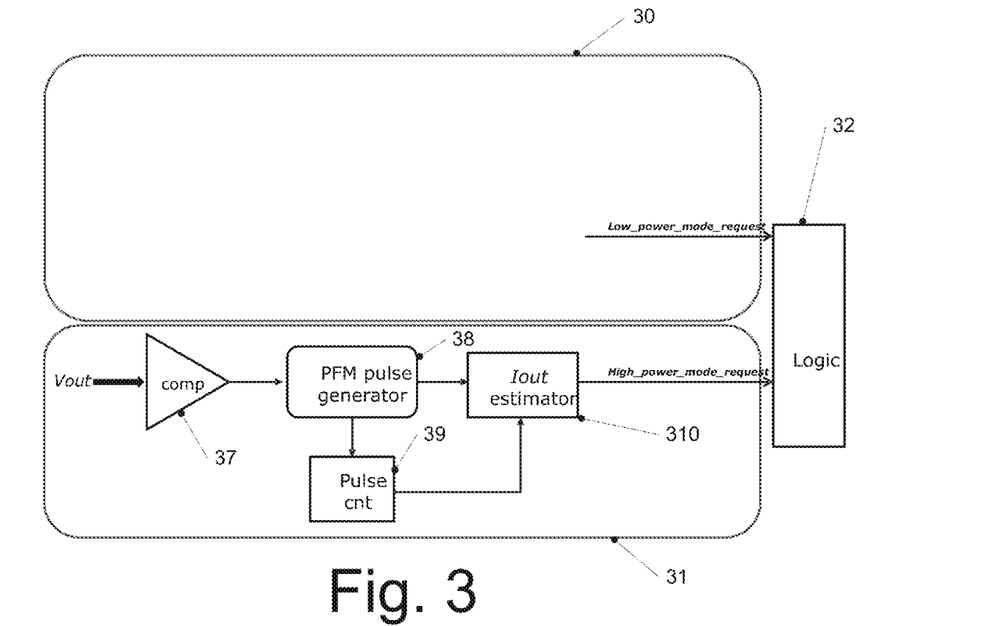
FIG. 3 is a diagram illustrating control concepts applicable to some embodiments.

In FIG. 3, a control scheme for switching between a PWM mode and a PFM mode is schematically illustrated.

A block 30 is active during a PWM mode of operation and, in case a required output power and/or a load coupled to a converter decreases, may request a change to a low power mode, for example a PFM mode. Block 30 may be implemented in any conventional manner and will not be discussed further. Block 30 may output a signal Low_power_mode_request to request a mode change.

A block 31 may be active in a PFM mode and may be implemented using techniques disclosed herein. Block 31 receives an output voltage Vout and may compare this output voltage to a desired value in a comparator 37. Based on the result of the comparison, a PFM pulse generator 38 controls switches like switches 23, 24 of FIG. 2 in a pulse frequency modulation scheme to adjust the output voltage to a desired value. A pulse counter 39 may perform a time measurement, may for example count a predetermined number of digital clock pulses during a tristate condition, for example a condition where both switches 23, 24 of FIG. 2 are open. Other embodiments may use other techniques for time measurement. If the tristate condition expires before the end of the counting (for example when one of switches 23, 24 is closed), an output current estimator 310 may decide that a necessary output current, for example due to a high load, is so high that a change to a high power mode, for example PWM mode should be performed. In this case, a signal High_power_mode_request may be output. Generally, in embodiments by counter like pulse counter 39 of FIG. 3 a decrease of tristate time may be detected as will be explained further below, and depending on the decrease a high power mode request may be issued. In some embodiments, based on the counter an output current estimation Iout may estimate an output current, and may decide on a change of mode based on the estimated current.

In the scheme of FIG. 3, the signals Low_power_mode_request and High_power_mode_request may be received by a logic 32, which may coordinate changing between the modes of operation.

Figure 4:
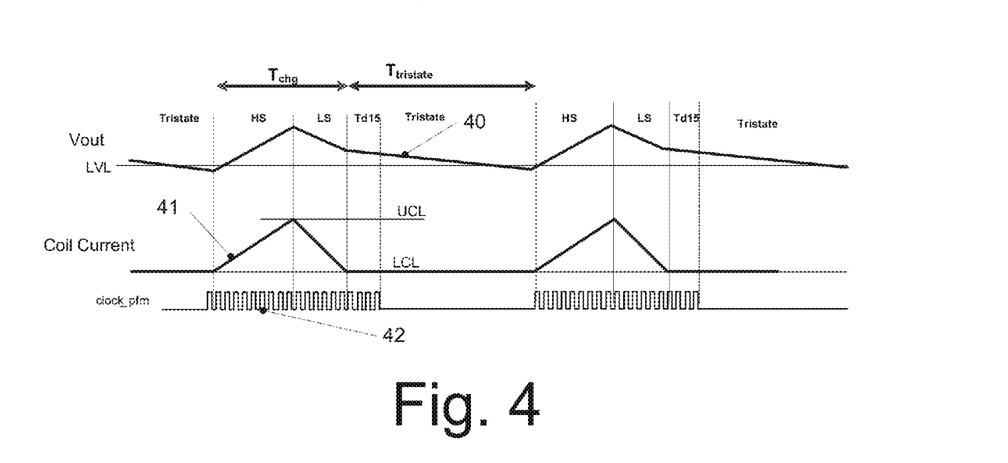
FIG. 4 illustrates example signals of some embodiments.

In FIG. 4, signals illustrating operation of a converter like the one shown in FIG. 2 in a PFM mode are illustrated. It should be noted that the signals shown in FIG. 4 serve only illustration purposes, and depending on implementation and load the signals may have different shapes and/or different timing. FIG. 4 shows an example where the PFM mode is sufficient to support a load.

A curve 40 illustrates an output voltage Vout, for example output voltage Vout of a buck converter as illustrated in FIG. 2. LVL illustrates a lower voltage level threshold under which the output voltage Vout should not fall in an application. A curve 41 illustrates a coil current, for example a current through inductor 210 of FIG. 2. UCL illustrates an upper current limit, and LCL illustrates a lower current limit. A curve 42 illustrates a clock signal used e.g. in a pulse frequency modulation control and/or for time measurements as will be discussed below.

As can be seen in curve 40, the output voltage Vout drops, for example due to discharging of capacitor 212 of FIG. 2, until Vout falls below LVL. During this phase, the switches are in a tristate, for example switches 23, 24 of FIG. 2 are open. When Vout falls below LVL, the high side switch (for example switch 23 in FIG. 2) is closed in a phase marked HS in FIG. 4. This charges an inductor (e.g. inductor 210 of FIG. 2), and the inductor current charges an output capacitor (for example capacitor 212), leading to an increase of Vout. This state is maintained until the coil current reaches the upper current limit UCL. When the coil current (curve 41) reaches the upper current limit, the high side switch (for example switch 23 of FIG. 2) is opened, and a low side switch (for example switch 24 of FIG. 2) is closed. This state is maintained during phases marked LS in FIG. 4. This discharges the inductor (e.g. inductor 210), and the inductor current, also referred to as coil current, is fed to the output capacitor (for example capacitor 212 of FIG. 2). This state lasts until the coil current reaches the lower current limit LCL. After this, the switches are switched to a tristate, for example both high side switch and low side switch being open. A time duration of phases HS and LS is labeled charging time $T_{chg}$ in FIG. 4. In the tristate phase, the voltage drops again until the lower voltage level is reached upon which the cycle starts anew. A duration of the tristate is labeled $T_{tristate}$ in FIG. 4.

In FIG. 4, as will be explained later in greater detail, clock signal 42 remains active a certain time, labeled Td15, after each phase LS during tristate. Details regarding how Td15 may be determined in some embodiments will be explained later. In the case of FIG. 4 with a comparatively low load, the tristate duration $T_{tristate}$ is longer than Td15.

Next, with reference to FIG. 5, an example case with a higher load will be explained.

Figure 5:
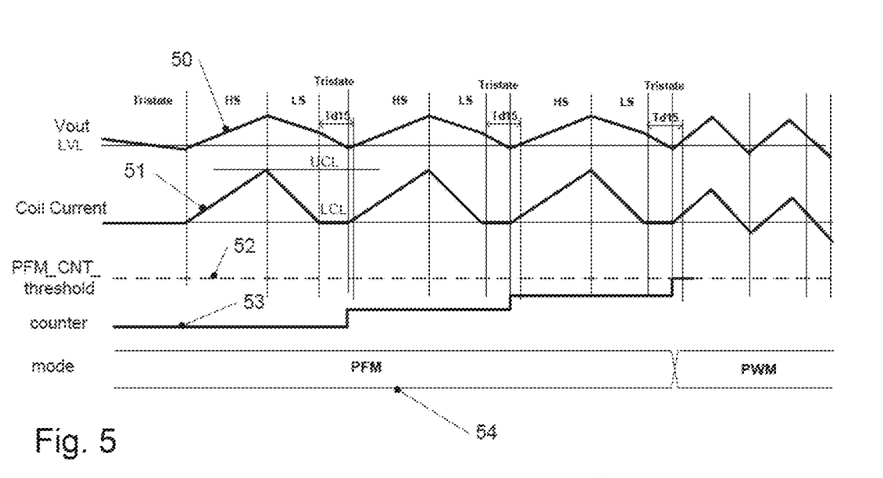
FIG. 5 illustrates further example signals of some embodiments.

As was explained for FIG. 4, the signals shown in FIG. 5 serve merely illustration purposes, and depending on an implementation, application and other circumstances actual signals may vary.

A curve 50 illustrates an output voltage, similar to curve 40 of FIG. 4. A curve 51 illustrates a coil current, similar to curve 41 of FIG. 4. Designations tristate, HS, LS, UCL, LCL and LVL correspond to the designations already used in FIG. 4.

A curve 55 illustrates a mode of operation, which first is a PFM mode and then changes to a PWM mode, as will be explained below in more detail.

The leftmost tristate phase in the diagram of FIG. 5 is similar to the tristate phases illustrated in FIG. 4. Then, for example due to a load increase, an output capacitor like capacitor 212 of FIG. 2 is discharged faster, leading to a faster drop of the output voltage Vout to the lower voltage level LVL. This in turn leads to a shortening of the tristate phase. As illustrated in FIG. 5, in particular the tristate phase may become shorter than the time Td15.

For example, referring back to FIG. 4, the tristate phase may end while a clock signal like clock signal 42 of FIG. 4 is still active. When the tristate phase is shorter than Td15, in some embodiments a counter is increased, as illustrated by a curve 53. When the counter reaches a threshold value (for example a value of 3 in the illustration of FIG. 5, although other values are possible), as illustrated by curve 54 a change to PWM mode is performed. As will be explained in the following, the time Td15 may correspond to an output current threshold, and when the tristate phase becomes shorter than Td15, this may indicate that the output current exceeds a threshold, which as illustrated may trigger a change to PWM mode.

In some embodiments, the use of a threshold as illustrated by 52 may prevent a changing back and forth between modes when for example only a single load spike occurs, which would increase the counter only by 1. In other words, setting the threshold value 52 appropriately in some embodiments may prevent oscillations between the operating modes.

The detection of a high load state illustrated in FIG. 5 may for example be implemented within a control loop for the switches, for example in controller 22 of FIG. 2 or controller 11 of FIG. 1 as well as in block 31 of FIG. 3. Further implementation possibilities will be explained further below in more detail. In other embodiments, an indication regarding the counter value or the counter value exceeding the threshold may be transmitted to some central control instance which may then take the final decision to change modes. In other words, in such embodiments the central control instance, for example an ECU, receives the information that the mode should be changed for example based on the counter value exceeding the threshold. In some embodiments, in addition to this indication that the mode should be changed the control instance may take other factors into account, for example knowledge about the switching on and off of loads in a device (for example in an automotive application a central controller like an electronic control unit (ECU) may know which components of a vehicle are switched on at a given moment, or will be switched on or off soon, which may be additionally considered).

Next, possibilities how to choose an appropriate time Td15 according to some embodiments will be described in detail.

As illustrated for example in FIG. 4, the charging time $T_{chg}$ is equal to:

$$T_{chg}=t(HS_{ON})+t(LS_{ON}) \tag{1}$$

wherein $t(HS_{ON})$ is the time during which a high side switch is closed (times labeled HS in FIGS. 4 and 5) and $t(LS_{ON})$ is the time where the low side switch is closed (labeled LS in FIGS. 4 and 5, for example).

With the upper current limit UCL, which is a peak value for the coil current as illustrated for example in FIGS. 4 and 5, an output capacitor is charged with $$T_{chg}\left(\frac{UCL}{2} - Iout\right) \quad (2)$$

and discharged with $$T_{tristate} Iout \quad (3)$$

wherein $T_{tristate}$ is the duration of the tristate phase and Iout is a load current.

Balancing the charging according to (2) with the discharging according (3), the following equation results:

$$T_{tristate} = T_{chg}\left(\frac{UCL}{2 \cdot Iout}\right) = k \cdot T_{chg}, \quad (4)$$

i.e.

$$k = \frac{UCL}{2 \cdot Iout} - 1 \quad (5)$$

Equation (4) may also be written as $$\frac{Iout}{\frac{UCL}{2}} = \frac{T_{chg}}{T_{chg} + T_{tristate}} = \frac{1}{1 + \frac{T_{tristate}}{T_{chg}}} \quad (6)$$

Therefore, based on equation (6) there is a relationship between the load current Iout and the ratio between tristate time $T_{tristate}$ to charging time $T_{chg}$.

Figure 8:
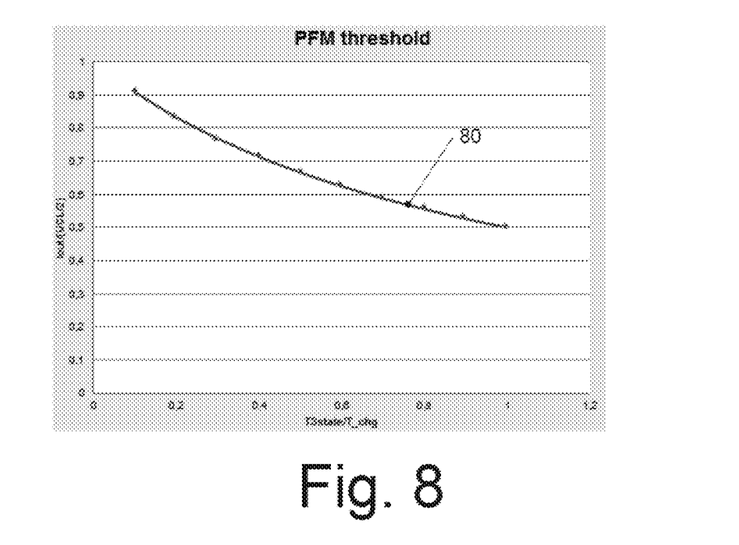
FIG. 8 is a diagram illustrating an example relationship between output current and timing.

The relationship of equation (6) is plotted in a curve 80 of FIG. 8. Therefore, reverting back to the example of FIGS. 4 and 5 for illustration purposes, using clock signal 42 the duration of the charging phase may be counted, and based on this a number of counts corresponds to the threshold time Td15 may be determined. Each value of Td15 corresponds to a certain ratio of threshold tristate time to charging time given by the respective number of pulses. Based on equation (6), this in turn corresponds to a threshold load current. To give an example, setting k in equation (4) to 0.5 would mean that time Td15 has half the cycles of clock signal 42 than the charging time $T_{chg}$. For example, k=0.5 corresponds to a threshold load current of $$Iout = \frac{UCL}{2} \cdot \frac{1}{1 + \frac{0.5 T_{chg}}{T_{chg}}} = \frac{UCL}{2} \cdot \frac{1}{1.5} = \frac{UCL}{3} \quad (7)$$

Furthermore, from equation (6) it is also evident that when the tristate phase becomes smaller (i.e. $T_{tristate}$ becomes smaller), this corresponds to a greater load current. Therefore, when $T_{tristate}$ becomes smaller than Td15 as illustrated in FIG. 5, this means that the load current Iout exceeded the threshold current selected by the respective time Td15/ratio k. As illustrated in FIG. 5 and explained above, when such an event indicating that the load current Iout exceeds the threshold current occurs a predetermined number of times (corresponding to threshold 52 in FIG. 5), the system may switch to PWM mode directly or may give a corresponding information to some central control unit, which may then decide on a change of operation mode.

In some embodiments, to allow different load current thresholds the charging time $T_{chg}$ may be scaled by different factors k, which may be digitally programmed in some embodiments. In the example of equation (7), the scaling factor would be 0.5. In other words, the scaled version of $T_{chg}$ corresponds to Td15. Therefore, in such embodiments, the scaling factor defines a specific load current threshold.

It should be noted that in some embodiments when the upper current limit UCL is changed, different thresholds result. Furthermore, it should be noted that in some embodiments using techniques described above, the threshold value is essentially independent from the input voltage. Therefore, in some embodiments techniques disclosed herein may be suitable for applications where the input voltage Vin may vary. For example in some automotive applications input voltages may vary in a wide range, for example from 6-20 V.

It should be noted that in some embodiments using techniques described above the determination whether to change to a PWM mode is independent from component values of external components like capacitors and inductors (for example inductor 210 and capacitors 211, 212) of FIG. 2). In embodiments where the threshold value is essentially independent from the inductance of an inductor like inductor 210, techniques disclosed herein may be suitable for applications where such an inductance may vary. Also, it should be noted that in some embodiments using techniques described above the threshold (e.g. threshold current corresponding to a threshold time) is essentially independent from an output voltage. Therefore, in some embodiments, techniques disclosed herein may be suitable for applications where the output voltage may vary, for example some point of load applications.

In some embodiments, an inductor like inductor 210 of FIG. 2 is charged during the time the high side switch is closed (phase HS) according to $$IL = \frac{Vin - Vout}{L} t \quad (8)$$

In equation (8), IL is an inductor current, and t is the time. In some embodiments, also resistive losses in the path, for example a resistance of a high side switch when a high side switch is closed and an equivalent series resistance of the inductor, may be taken into account. In embodiments, when Vin comes close to Vout, as can be seen in equation (8), the rise will become very slow, which has the consequence that the coil current IL may not reach UCL. This in some cases may lead to an overvoltage. In some embodiments, the timeout may be detected when the time of the HS phase exceeds a threshold, and upon detection of the timeout a mode change or other measures may be initiated.

Figure 6:
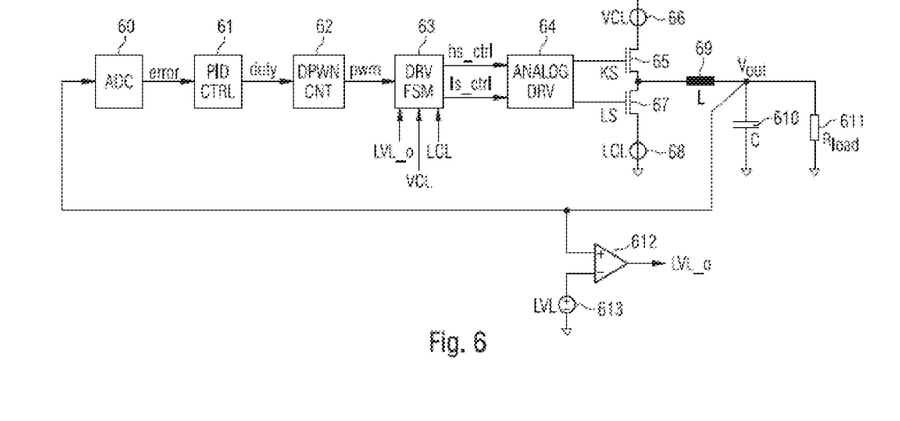
FIG. 6 is a block diagram of a converter according to an embodiment.

In FIG. 6, a device according to a further embodiment is illustrated, which may implement techniques as discussed above, for example as discussed above with reference to FIGS. 4 and 5. FIG. 6 illustrates a buck converter device including a control loop. The device of FIG. 6 comprises a high side switch 65 and a low side switch 67. High side switch 65 and low side switch 67 may selectively be operated in a PFM mode or in a PWM mode. An inductor 69 and an output capacitor 610 are coupled to a node between high side switch 65 and low side switch 67. In the example embodiment of FIG. 6, high side switch 65 and low side switch 67 are implemented using transistors. A load is represented by a load resistor 611, which may represent any load supplied by an output voltage Vout.

66 represents a first comparator which measures a current through switch 65 and compares it to an upper current limit UCL. 68 represents a second comparator which measures a current through second switch 67 and compares it to a lower current limit LCL.

The output voltage Vout is fed back to an analog to digital converter (ADC) 60. ADC 60 converts the output voltage to a digital value and compares it to a reference value, for example a target voltage, to output an error value based on the comparison. Furthermore, the output voltage Vout is fed to a comparator 612, where it is compared to a lower voltage limit LVL supplied at 613. A result of the comparison is output as LVL_o.

The error signal output by analog to digital converter 60 is fed to a PID controller 61 (proportional integral derivative), although in other embodiments other kinds of controllers may also be used. PID controller 61 outputs a duty cycle signal indicating a duty cycle in response of the error signal, for example a duty cycle for HS/LS phases. The duty cycle signal is fed to a digital pulse width modulation counter 62, which outputs a pulse width modulation information signal pwm. Signal pwm is provided to a driver logic 63. Driver logic 63 also receives signals LVL_o and signals UCL, LCL indicating when the coil current reaches the upper current limit or lower current limit, respectively. In response to these signals, driver logic 63 outputs signals hs_ctrl and ls_ctrl which indicate a desired state of switches 65, 67, respectively. Analog driver 64 then controls switches 65, 67 in response to the digital control signals hs_ctrl and ls_ctrl.

Figure 7:
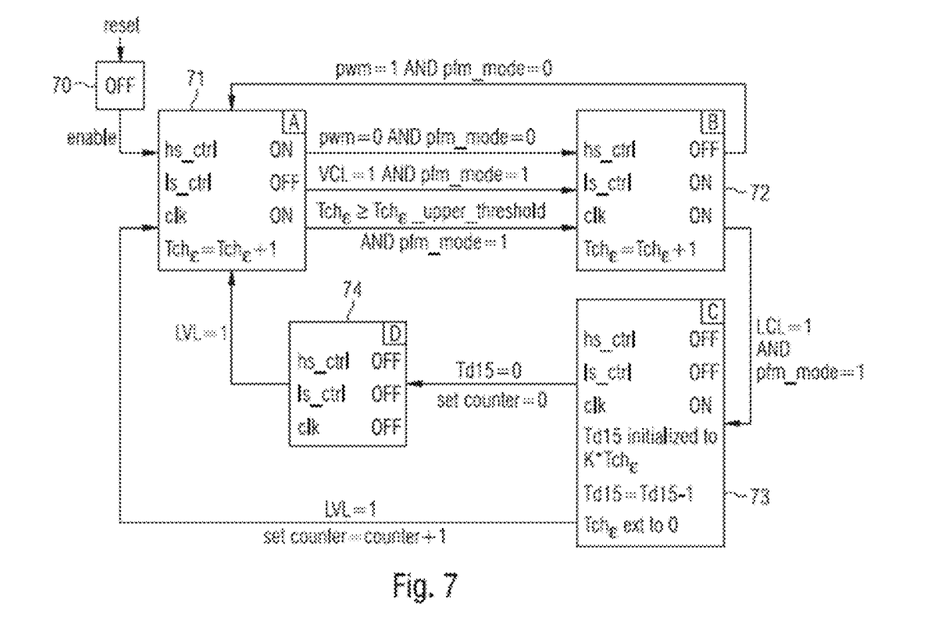
FIG. 7 is a block diagram of a state machine according to an embodiment.

In some embodiments, driver logic 63 may be implemented as a finite state machine (FSM), although other logic implementations are also possible. An example for an implementation of a suitable finite state machine is illustrated in FIG. 7. FIG. 7 illustrates merely one example implementation of a suitable state machine, and in other embodiments, other implementations, for example implementations having a different number of states, may be used. For better illustration, FIG. 7 will be explained referring to the example signals of FIGS. 4 and 5. This is not to be construed as limiting. In the embodiment of FIG. 7, after a reset the state machine is in an off-state 70. When the state machine is then activated, during operation it is active in one of four states 71-74. Taking the signals of FIGS. 4 and 5 as illustrative examples, state 71 and state 72 pertain to a charging phase (HS and LS, respectively), and states 73 and 74 pertain to a tristate phase.

In particular, in state 71 signal hs_ctrl is on, and ls_ctrl is off, indicating that for example in the embodiment of FIG. 6 high side switch 65 is closed and low side switch 67 is open. This corresponds for example to the phases HS in FIGS. 4 and 5. Furthermore, in the example of FIG. 7, a clock signal (for example clock signal 42 of FIG. 4) is on.

In each clock cycle of the clock signal in which the state machine of FIG. 7 remains in state 71, a charging time variable Tchg is increased by 1. This, as will be seen, serves for measuring the charging time $T_{chg}$ in units of the clock signal (like e.g. clock signal 42 of FIG. 4).

Under various conditions, the state machine of FIG. 7 may make a transition from state 71 to a state 72. The conditions are noted above various arrows shown in FIG. 7. A first condition is that a variable pfm.mode is 0, which in this example indicates that the state machine is operating in pulse width modulation (PWM) mode and a variable pwm=0. The variable pwm in this case indicates the pulses of a pulse width modulation operation.

Furthermore, in case pfm.mode=1 which indicates an operation in PFM mode, the system transitions to state 72 when UCL=1 (corresponding to reaching the upper current limit in FIG. 4 or 5, for example) or when some predetermined upper threshold $T_{chg}$_upper_threshold for the charging time variable Tchg has been reached. In some embodiments, using such an upper threshold for the charging time may avoid overvoltage, as mentioned above in the explanation of equation (8). In other embodiments, this upper threshold may be omitted.

In state 72, hs_ctrl is off and ls_ctrl is on. Therefore, a low side switch like switch 67 is closed, and a high side switch like switch 65 of FIG. 6 is open, corresponding for example to phases LS of FIGS. 4 and 5. Furthermore, the clock signal clk continues to be on, and the charging time variable Tchg continues to be incremented to measure the total charging time duration $T_{chg}$.

In a pulse width modulation operation mode (pfm.mode=0), the state machine returns to state 71 when pwm becomes 1. In other words, in a PWM mode the control signal pwm alternates between 0 and 1, causing a changing between state 71 and 72 to alternately close a high side and a low side switch. In PFM mode (pfm.mode=1), the state machine transitions to state 73 when LCL=1, indicating that the coil current reaches the lower current limit. In state 73, both hs_ctrl and ls_ctrl are off, i.e. both high side switch and low side switch are open, corresponding to a tristate.

The clock signal clk continues to be on in state 73. In this respect, state 73 may correspond to the duration Td15 in FIGS. 4 and 5, where the clock signal is still on. A variable Td15 is initialized at assertion of state 73 to k-Tchg, Tchg being the end value of the incrementing of Tchg in states 71 and 72. As explained previously with reference to equations (1) to (7), each value of k corresponds to a certain threshold ratio between the tristate time and charging time and therefore to a threshold output current.

It should be noted that in some embodiments the low side switch may be implemented comprising a diode. In such embodiments, the value LCL may be generated with a comparator coupled to a switching node (like 27 in FIG. 2). LVL in such an embodiment may be set to 1 when the voltage at this switching node exceeds a threshold, for example 0 V.

Then, in state 73 with each period of the clock signal like clock signal 42 Td15 is decreased by 1. Furthermore, in state 73, after the initializing of Td15 Tchg is reset to 0.

When Td15 reaches 0, which corresponds to the expiry of the time Td15, a counter (which may correspond to counter 53 of FIG. 5) is set to 0, and the state machine transitions to a state 74. In state 74, still hs_ctrl and ls_ctrl are off, and the clock signal clk is off. This corresponds to the tristate phases after the expiry of Td15 in FIGS. 4 and 5, to give an example. When the voltage reaches a lower voltage level LVL (LVL=1) in state 74, the state machine transitions again to state 71, and the above-described cycle starts anew.

When LVL=1, i.e. the output voltage reaches the lower voltage level, while Td15 has not yet reached 0, the state machine transitions directly from state 73 to state 71, and the variable counter (e.g. counter 53 in FIG. 5) is increased by 1. As already explained above, in particular with respect to FIG. 5, when the variable counter reaches a predetermined limit (3 in the example of FIG. 5), the system may transition to PWM mode (corresponding to setting pfm.mode to 0).

Figure 9:
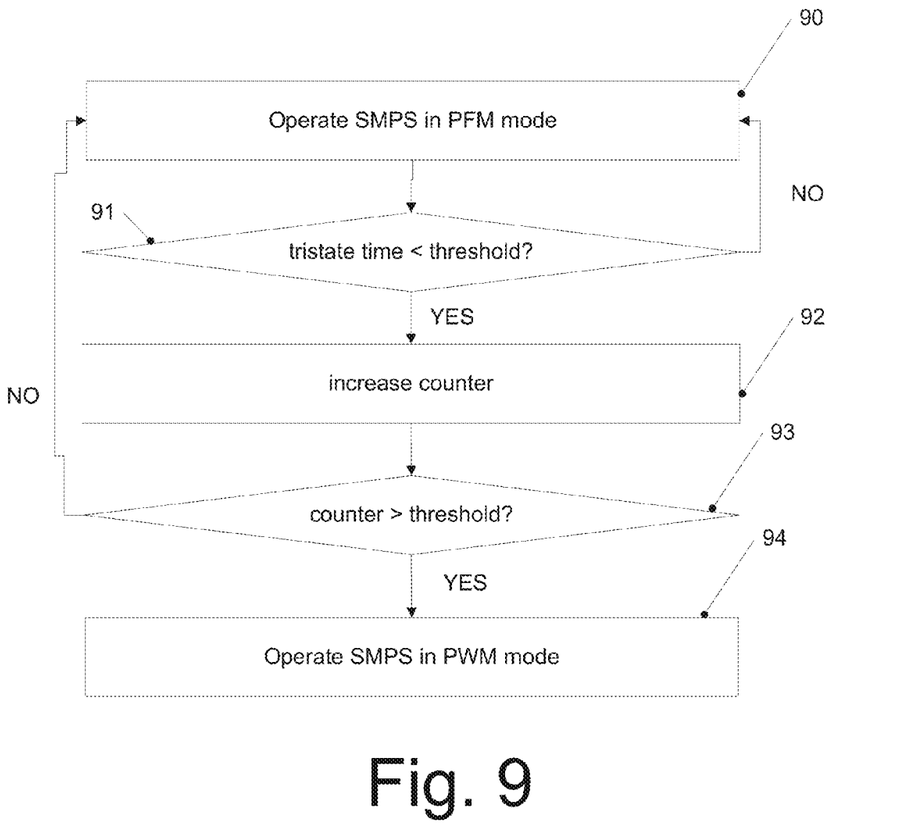
FIG. 9 is a flowchart illustrating a method according to an embodiment.

In FIG. 9, a method according to an embodiment is illustrated. While the method of FIG. 9 is illustrated as a series of acts or events, the order in which such acts or events are described or shown in the drawings is not to be construed as limiting. For example, acts or events may be performed in a different order than shown, and/or may be performed concurrently with each other, for example in different parts of a circuit. In other embodiments, some of the acts or events represented may be omitted, or additional acts or events may be present. The method of FIG. 9 may for example be implemented using one or more of the devices and techniques discussed above, but is not limited thereto.

At 90 in FIG. 9, the method comprises operating a switch mode power supply in a PFM mode.

At 91, the method comprises evaluating if a tristate time is shorter than a threshold time. To give an example, the threshold time may correspond to the time Td15 explained above. In case this is not the case ("NO" at 91), the method is continued at 90.

If the tristate time is shorter than the threshold time ("YES" at 91), at 92 the method comprises increasing a counter. At 93, the method comprises evaluating if the counter exceeds a threshold, for example the threshold illustrated in FIG. 5. If this is not the case ("NO" at 93), the method is continued at 90. If the counter exceeds the threshold ("YES" at 93), a change is made to an operation in a PWM mode at 94. In other embodiments, other methods may be implemented.

In some of the above-described embodiments, the threshold time Td15 is measured based on a digital clock signal, for example signal 42 of FIG. 4. In other embodiments, other techniques may be used for generating and determining a threshold time.

Figure 10:
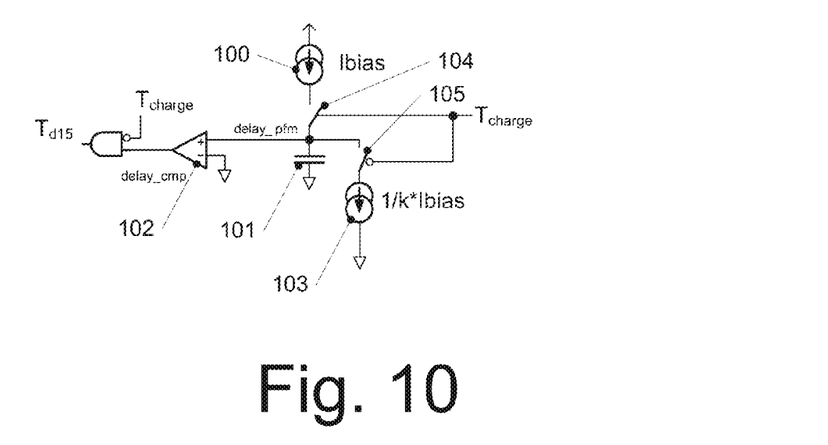
FIG. 10 is a circuit diagram illustrating a circuit for determining a threshold time according to an embodiment.
Figure 11:
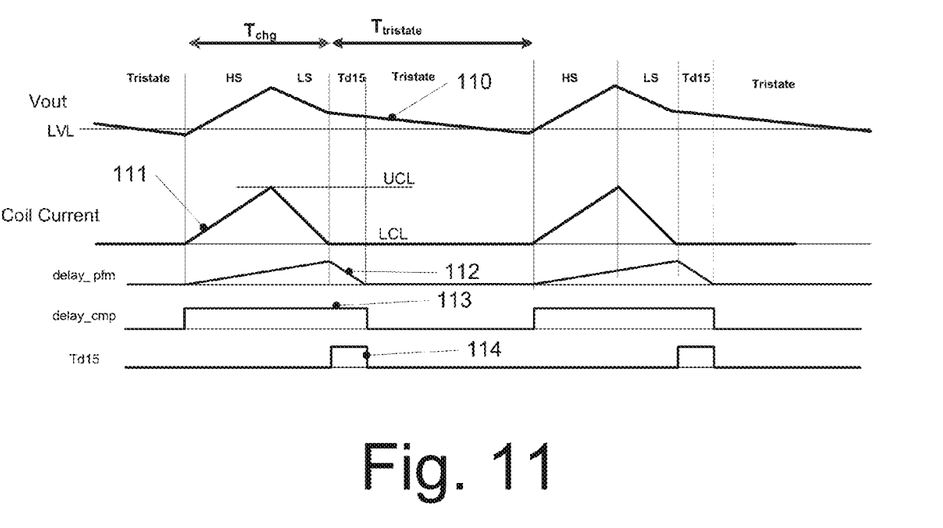
FIG. 11 illustrates example signals for the embodiment of FIG. 10.

FIG. 10 illustrates an example for such an alternative embodiment, and FIG. 11 by way of example illustrates signals corresponding to the embodiment of FIG. 10. However, the signals of FIG. 11 serve merely as examples, and depending on the implementation of the embodiment of FIG. 10 the signals may vary. In particular, FIGS. 10 and 11 illustrate an at least partially analog time generation. In FIG. 10, a signal $T_{charge}$ closes a switch 104 and opens a switch 105 during the charge time Tcharge, for example during phases HS and LS as described above, and opens switch 104 and closes switch 105 outside the charge time, e.g. during tristate. When switch 104 is closed, a current source 100 charges a capacitor 101 with a current Ibias. When switch 105 is closed, a current source 103 discharges capacitor 101 with a current 1/k·Ibias, k being as defined in equation (4) and as explained above. A signal for the discharge time Td15 is generated by a comparator 102 which compares a voltage at capacitor 101 with a reference, for example ground. An output signal of comparator 102 is output by a logic gate 106 outside the charging time, i.e. during tristate.

FIG. 11 illustrates corresponding signals. Curves 110 and 111 of FIG. 11 correspond to curves 40 and 41 of FIG. 4 and will therefore not be explained again. A curve 112 illustrates a signal delay_pfm in FIG. 10, i.e. a voltage at capacitor 101. A curve 113 illustrates a signal delay_cmp output by comparator 102. A curve 114 illustrates the signal Td15 output by logic gate 106. Therefore, in the example shown the signal Td15 may for example be logic 1 during the time Td15 and logic 0 otherwise. In case the embodiment of FIG. 10 is used together with a state machine like the one shown in FIG. 7, for example the initializing of Td15 and the decreasing of Td15 in state 73 may be omitted and is essentially replaced by the analog circuit of FIG. 10.

The above-described embodiments serve merely as examples, and are not to be construed as limiting. Embodiments may be implemented using software, hardware, firmware or combinations thereof. For example, digital portions of the embodiment of FIG. 6 may be implemented using software running on a processor like a general purpose processor or a dedicated processor or may be programmed in hardware using for example application-specific integrated circuits (ASICs), and/or field programmable gate arrays (FPGA). While some embodiments have been described by referring to other embodiments to provide a clearer understanding, this is not to be construed as indicating that the respective embodiments may be used only in combination with each other. Instead, the described embodiments may be used independently form each other. Also, while specific types of converters like buck converters have been used for illustration, techniques disclosed herein may also be applicable to other types of converters like boost converters. Other techniques may also be employed.

What is claimed is:

1. A device, comprising:
a first switch, a first load terminal of the first switch being coupled with a first voltage input and a second load terminal of the first switch being coupled with an output node, a second switch, a first load terminal of the second switch being coupled with the output node and a second load terminal of the second switch being coupled with a second voltage input, and a controller, the controller being coupled to a control input of the first switch and a control input of the second switch,
wherein the controller is adapted to control the first switch and the second switch selectively in a first mode of operation or a second mode of operation, the controller being adapted to change from the second mode of operation to the first mode of operation based on a time where both the first and second switches are open, and
wherein the controller is adapted to change from the second mode to the first mode based on a ratio between the time where both the first and second switches are open and a time where at least one of the first switch or the second switch is closed.

2. The device of claim 1, wherein the first mode of operation is a pulse width modulation mode, and the second mode of operation is a pulse frequency modulation mode.

3. A device comprising:
a first switch, a first load terminal of the first switch being coupled with a first voltage input and a second load terminal of the first switch being coupled with an output node,
a second switch, a first load terminal of the second switch being coupled with the output node and a second load terminal of the second switch being coupled with a second voltage input, and
a controller, the controller being coupled to a control input of the first switch and a control input of the second switch,
wherein the controller is adapted to control the first switch and the second switch selectively in a first mode of operation or a second mode of operation, the controller being adapted to change from the second mode of operation to the first mode of operation based on a time where both the first and second switches are open, and
wherein the controller is adapted to determine if a time during which both the first switch and the second switch are open exceeds a threshold time, and to switch to the first mode of operation when the threshold time has been exceeded a predetermined number of times.

4. The device of claim 3, wherein the controller is further adapted to determine the threshold time based on a time during which at least one of the first switch and the second switch is closed.

5. The device of claim 3, wherein a clock signal is active from a start of a phase where both the first switch and the second switch are open up to reaching the threshold time, and inactive for a remainder of the phase.

6. The device of claim 1, wherein the device is adapted to measure the time digitally.

7. A device comprising:
a first switch, a first load terminal of the first switch being coupled with a first voltage input and a second load terminal of the first switch being coupled with an output node,
a second switch, a first load terminal of the second switch being coupled with the output node and a second load terminal of the second switch being coupled with a second voltage input, and
a controller, the controller being coupled to a control input of the first switch and a control input of the second switch,
wherein the controller is adapted to control the first switch and the second switch selectively in a first mode of operation or a second mode of operation, the controller being adapted to change from the second mode of operation to the first mode of operation based on a time where both the first and second switches are open, and
wherein the controller comprises a counter counting clock pulses during at least one of a phase where at least one of the first switch or the second switch is closed or a phase where both the first switch and the second switch are open.

8. The device of claim 1, wherein the device comprises an at least partially analog circuit to measure the time.

9. The device of claim 1, wherein the controller comprises a state machine.

10. A controller, the controller being adapted to control a high side switch and a low side switch of a voltage converter, the controller comprising a state machine, the state machine comprising:
a first state where the high side switch is controlled to be closed, the low side switch is controlled to be open, a clock signal is on and a charging time variable is increased based on the clock signal,
a second state where the high side switch is controlled to be open, the low side switch is controlled to be closed, the clock signal is on and the charging time variable is increased based on the clock signal, wherein the state machine is adapted to transition from the first state to the second state in a pulse frequency modulation mode when a current through the high side switch reaches an upper current limit, wherein the state machine is adapted to transition from the second state to a third state when a current through the low side switch reaches a lower current limit in the pulse frequency modulation mode,
the third state where the high side switch is controlled to be open, the low side switch is controlled to be open, the clock signal is on, a threshold time variable is initialized based on the charging time variable, and the threshold time variable is decreased based on the clock signal, wherein the state machine is adapted to transition from the third state to a fourth state when the threshold time variable reaches 0 before an output voltage reaches a lower voltage limit, wherein the state machine is adapted to transition from the third state to the first state and to increase a counter variable when the output voltage reaches the lower voltage limit before the threshold time variable reaches 0,
the fourth state where both the high side switch and the low side switch are controlled to be open, and the clock signal is deactivated, wherein the state machine is adapted to transition from the fourth state to the first state when the output voltage reaches the lower voltage level,
wherein the controller is adapted to leave the pulse frequency mode of operation when the counter reaches a predetermined threshold.

11. The controller of claim 10, wherein the state machine is operable in a pulse width modulation mode, wherein in the pulse width modulation mode the state machine is adapted to transition between the first state and the second state based on a pulse width modulation control signal.

12. The controller of claim 10, wherein the state machine is adapted to transition from the first state to the second state when the charging time variable reaches a predetermined threshold charging time.

13. A method, comprising:
controlling a first switch and a second switch selectively in a first mode of operation or a second mode of operation, and
changing from the second mode of operation to the first mode of operation based on a timing ratio between a time where both first and second switch are open and a time where at least one of the first switch or the second switch is closed.

14. The method of claim 13, wherein the first mode of operation is a pulse width modulation mode, and the second mode of operation is a pulse frequency modulation mode.

15. The method of claim 13, further comprising determining if a time during which both the first switch and the second switch are open exceeds a threshold time, and to changing to the first mode of operation when the threshold time has been exceeded a predetermined number of times.

16. The method of claim 15, further comprising determining the predetermined threshold time based on a time during which at least one of the first switch and the second switch is closed.

17. The method of claim 16, wherein determining the predetermined threshold time comprises scaling the time during which at least one of the first switch and the second switch is closed.

18. The method of claim 15, further comprising activating a clock signal from a start of a phase where both the first switch and the second switch are open up to reaching the predetermined threshold time, and deactivating the clock signal for a remainder of the phase.

19. The method of claim 13, further comprising counting clock pulses during at least one of a phase where at least one of the first switch or the second switch is closed or a phase where both the first switch and the second switch are open.

* * * * *